United States Patent
Wu

(10) Patent No.: US 7,517,484 B2
(45) Date of Patent: *Apr. 14, 2009

(54) FORMING EVACUATION CHANNELS DURING SINGLE AND MULTI-LAYER EXTRUSION PROCESS

(75) Inventor: Hongyu Wu, San Jose, CA (US)

(73) Assignee: Sunbeam Products, Inc., Boca Raton, FL (US)

( * ) Notice: Subject to any disclaimer, the term of this patent is extended or adjusted under 35 U.S.C. 154(b) by 761 days.

This patent is subject to a terminal disclaimer.

(21) Appl. No.: 10/801,950

(22) Filed: Mar. 15, 2004

(65) Prior Publication Data

US 2004/0256050 A1 Dec. 23, 2004

Related U.S. Application Data

(60) Provisional application No. 60/457,496, filed on Mar. 24, 2003.

(51) Int. Cl.
*B29C 47/06* (2006.01)

(52) U.S. Cl. ............... 264/173.1; 264/173.12; 264/173.16

(58) Field of Classification Search ............ 264/172.19, 264/173.1, 173.11, 173.12, 173.16
See application file for complete search history.

(56) References Cited

U.S. PATENT DOCUMENTS

| 274,447 | A | 3/1883 | Kennish |
|---|---|---|---|
| 1,938,593 | A | 12/1933 | Jarrier |
| 2,085,766 | A | 7/1937 | Potdevin et al. |
| 2,105,376 | A | 1/1938 | Scott |
| 2,265,075 | A | 12/1941 | Knuetter |
| 2,387,812 | A | 10/1945 | Sonneborn et al. |
| 2,429,482 | A | 10/1947 | Munters |
| 2,480,316 | A | 8/1949 | Blair et al. |
| 2,607,712 | A | 8/1952 | Sturken |
| 2,609,314 | A | 9/1952 | Engel et al. |
| 2,633,442 | A | 3/1953 | Caldwell |
| 2,642,372 | A | 6/1953 | Chittick |
| 2,670,501 | A | 3/1954 | Michiels |
| 2,690,206 | A | 9/1954 | Mueller |
| 2,695,741 | A | 11/1954 | Haley |
| 2,759,866 | A | 8/1956 | Seymour |
| 2,772,712 | A | 12/1956 | Post |
| 2,776,452 | A | 1/1957 | Chavannes |
| 2,778,171 | A | 1/1957 | Taunton |
| 2,778,173 | A | 1/1957 | Taunton |
| 2,789,609 | A | 4/1957 | Post |
| 2,821,338 | A | 1/1958 | Metzger |
| 2,856,323 | A | 10/1958 | Gordon |
| 2,858,247 | A | 10/1958 | De Swart |
| 2,913,030 | A | 11/1959 | Fisher |
| 2,916,411 | A | 12/1959 | Villoresi |

(Continued)

FOREIGN PATENT DOCUMENTS

EP 0723915 A1 7/1996

(Continued)

*Primary Examiner*—Jill L Heitbrink
(74) *Attorney, Agent, or Firm*—Lawrence J. Shurupoff

(57) ABSTRACT

A method for making a vacuum packaging film includes flowing a plastic melt, from a multi-layer extruder, onto a rotating roller. The plastic melt is then cooled while simultaneously imparting a pattern, via a pattern imparting means, onto the plastic melt resulting in the vacuum packaging film.

26 Claims, 18 Drawing Sheets

U.S. PATENT DOCUMENTS

| | | | |
|---|---|---|---|
| 2,960,144 A | 11/1960 | Graf | |
| 3,026,231 A | 3/1962 | Chavannes | |
| 3,060,985 A | 10/1962 | Vance et al. | |
| 3,077,262 A | 2/1963 | Gaste | |
| 3,077,428 A | 2/1963 | Heuser et al. | |
| 3,098,563 A | 7/1963 | Skees | |
| 3,102,676 A | 9/1963 | Danelli et al. | |
| 3,113,715 A | 12/1963 | Pangrac | |
| 3,135,411 A | 6/1964 | Osborne | |
| 3,141,221 A | 7/1964 | Faulls, Jr. | |
| 3,142,599 A | 7/1964 | Chavannes | |
| 3,149,772 A | 9/1964 | Olsson | |
| 3,160,323 A | 12/1964 | Weisberg | |
| 3,224,574 A | 12/1965 | McConnell et al. | |
| 3,237,844 A | 3/1966 | Hughes | |
| 3,251,463 A | 5/1966 | Bodet | |
| 3,325,084 A | 6/1967 | Ausnit | |
| 3,334,805 A | 8/1967 | Halbach | |
| 3,381,887 A | 5/1968 | Lowry | |
| 3,411,698 A | 11/1968 | Reynolds | |
| 3,423,231 A | 1/1969 | Lutzmann | |
| 3,516,217 A | 6/1970 | Gildersleeve | |
| 3,533,548 A | 10/1970 | Taterka | |
| 3,565,147 A | 2/1971 | Ausnit | |
| 3,575,781 A | 4/1971 | Pezely | |
| 3,595,467 A | 7/1971 | Goglio | |
| 3,595,722 A | 7/1971 | Dawbarn | |
| 3,595,740 A | 7/1971 | Gerow | |
| 3,600,267 A | 8/1971 | McFedries, Jr. | |
| 3,661,677 A | 5/1972 | Wang | |
| 3,785,111 A | 1/1974 | Pike | |
| 3,799,427 A | 3/1974 | Goglio | |
| 3,809,217 A | 5/1974 | Harrison | |
| 3,833,166 A | 9/1974 | Murray | |
| 3,895,153 A | 7/1975 | Johnston et al. | |
| 3,904,465 A * | 9/1975 | Haase et al. | 156/199 |
| 3,908,070 A * | 9/1975 | Marzolf | 428/215 |
| 3,937,395 A | 2/1976 | Lawes | |
| 3,958,391 A | 5/1976 | Kujubu | |
| 3,958,693 A | 5/1976 | Greene | |
| 3,980,226 A | 9/1976 | Franz | |
| 3,998,499 A | 12/1976 | Chiarotto | |
| 4,018,253 A | 4/1977 | Kaufman | |
| 4,066,167 A | 1/1978 | Hanna et al. | |
| 4,098,404 A | 7/1978 | Markert | |
| 4,104,404 A | 8/1978 | Bieler et al. | |
| 4,105,491 A | 8/1978 | Haase et al. | |
| 4,155,453 A | 5/1979 | Ono | |
| 4,164,111 A | 8/1979 | Di Bernardo | |
| 4,179,862 A | 12/1979 | Landolt | |
| 4,186,786 A | 2/1980 | Kirkpatrick | |
| 4,212,337 A | 7/1980 | Kamp | |
| 4,215,725 A | 8/1980 | Callet et al. | |
| 4,295,566 A | 10/1981 | Vincek | |
| 4,310,118 A | 1/1982 | Kisida et al. | |
| 4,340,558 A | 7/1982 | Hendrickson | |
| 4,370,187 A | 1/1983 | Katagiri et al. | |
| 4,372,921 A | 2/1983 | Sanderson et al. | |
| 4,449,243 A | 5/1984 | Platel | |
| 4,486,923 A | 12/1984 | Briggs | |
| 4,532,652 A | 7/1985 | Herrington | |
| 4,551,379 A | 11/1985 | Kerr | |
| 4,569,712 A | 2/1986 | Shibano et al. | |
| 4,575,990 A | 3/1986 | Von Bismarck | |
| 4,576,283 A | 3/1986 | Fafournoux | |
| 4,576,285 A | 3/1986 | Goglio | |
| 4,579,756 A | 4/1986 | Edgel | |
| 4,583,347 A | 4/1986 | Nielsen | |
| 4,626,574 A * | 12/1986 | Cancio et al. | 525/240 |
| 4,658,434 A | 4/1987 | Murray | |
| 4,669,124 A | 5/1987 | Kimura | |
| 4,672,684 A | 6/1987 | Barnes et al. | |
| 4,683,702 A | 8/1987 | Vis | |
| 4,705,174 A | 11/1987 | Goglio | |
| 4,712,574 A | 12/1987 | Perrott | |
| 4,747,702 A | 5/1988 | Scheibner | |
| 4,756,422 A | 7/1988 | Kristen | |
| 4,756,629 A | 7/1988 | Tilman et al. | |
| 4,778,282 A | 10/1988 | Borchardt et al. | |
| 4,786,285 A | 11/1988 | Jambor | |
| 4,812,056 A | 3/1989 | Zieke | |
| 4,834,554 A | 5/1989 | Stetler, Jr. et al. | |
| 4,841,603 A | 6/1989 | Ragni | |
| 4,871,264 A | 10/1989 | Robbins, III et al. | |
| 4,877,334 A | 10/1989 | Cope | |
| 4,887,912 A | 12/1989 | Stumpf | |
| 4,890,637 A | 1/1990 | Lamparter | |
| 4,892,414 A | 1/1990 | Ausnit | |
| 4,903,718 A | 2/1990 | Sullivan | |
| 4,906,108 A | 3/1990 | Herrington et al. | |
| 4,913,561 A | 4/1990 | Beer | |
| 4,917,506 A | 4/1990 | Scheibner | |
| 4,917,844 A | 4/1990 | Komai et al. | |
| 4,941,310 A | 7/1990 | Kristen | |
| 4,953,708 A | 9/1990 | Beer et al. | |
| 4,973,171 A | 11/1990 | Bullard | |
| 5,006,056 A | 4/1991 | Mainstone et al. | |
| 5,040,904 A | 8/1991 | Cornwell | |
| 5,048,269 A | 9/1991 | Deni | |
| D320,549 S | 10/1991 | McKellar et al. | |
| 5,053,091 A | 10/1991 | Giljam et al. | |
| 5,063,639 A | 11/1991 | Boeckmann et al. | |
| 5,080,155 A | 1/1992 | Crozier | |
| 5,097,956 A | 3/1992 | Davis | |
| 5,098,497 A | 3/1992 | Brinley | |
| 5,106,688 A | 4/1992 | Bradfute et al. | |
| 5,111,838 A | 5/1992 | Langston | |
| 5,116,444 A | 5/1992 | Fox | |
| 5,121,590 A | 6/1992 | Scanlan | |
| 5,142,970 A | 9/1992 | ErkenBrack | |
| 5,203,458 A | 4/1993 | Cornwell | |
| 5,209,264 A | 5/1993 | Koyanagi | |
| D338,399 S | 8/1993 | Conte, Jr. | |
| 5,240,112 A | 8/1993 | Newburger | |
| 5,242,516 A | 9/1993 | Custer et al. | |
| 5,246,114 A | 9/1993 | Underwood | |
| 5,252,379 A | 10/1993 | Kuribayashi et al. | |
| 5,332,095 A | 7/1994 | Wu | |
| 5,333,736 A | 8/1994 | Kawamura | |
| 5,339,959 A | 8/1994 | Cornwell | |
| 5,352,323 A | 10/1994 | Chi | |
| 5,362,351 A | 11/1994 | Karszes | |
| 5,368,394 A | 11/1994 | Scott et al. | |
| 5,371,925 A | 12/1994 | Sawatsky | |
| 5,373,965 A | 12/1994 | Halm et al. | |
| 5,397,182 A | 3/1995 | Gaible et al. | |
| 5,402,906 A | 4/1995 | Brown et al. | |
| RE34,929 E | 5/1995 | Kristen | |
| D360,578 S | 7/1995 | Dees | |
| 5,445,275 A | 8/1995 | Curley et al. | |
| 5,450,963 A | 9/1995 | Carson | |
| 5,480,030 A | 1/1996 | Sweeney et al. | |
| 5,526,843 A | 6/1996 | Wolf et al. | |
| 5,540,500 A | 7/1996 | Tanaka | |
| 5,542,902 A | 8/1996 | Richison et al. | |
| 5,544,752 A | 8/1996 | Cox | |
| 5,549,944 A | 8/1996 | Abate | |
| 5,551,213 A | 9/1996 | Koelsch et al. | |
| 5,554,423 A | 9/1996 | Abate | |
| 5,584,409 A | 12/1996 | Chemberlen | |
| 5,592,697 A | 1/1997 | Young | |
| 5,620,098 A | 4/1997 | Boos et al. | |
| 5,638,664 A | 6/1997 | Levsen et al. | |
| 5,655,273 A | 8/1997 | Tomic et al. | |

| | | | | | | |
|---|---|---|---|---|---|---|
| 5,656,209 | A | 8/1997 | Benz et al. | 6,164,826 A | 12/2000 | Petkovsek |
| 5,665,456 | A | 9/1997 | Kannankeril et al. | 6,202,849 B1 | 3/2001 | Graham |
| 5,689,866 | A | 11/1997 | Kasai et al. | 6,220,702 B1 | 4/2001 | Nakamura et al. |
| 5,699,936 | A | 12/1997 | Sakamoto | 6,224,528 B1 | 5/2001 | Bell |
| 5,701,996 | A | 12/1997 | Goto et al. | 6,227,706 B1 | 5/2001 | Tran |
| 5,709,467 | A | 1/1998 | Galliano, II | 6,231,234 B1 | 5/2001 | Gebhardt |
| 5,735,395 | A | 4/1998 | Lo | 6,231,236 B1 | 5/2001 | Tilman |
| 5,749,493 | A | 5/1998 | Boone et al. | 6,274,181 B1 | 8/2001 | Richison et al. |
| 5,765,608 | A | 6/1998 | Kristen | D451,542 S | 12/2001 | Ishizawa et al. |
| 5,772,034 | A | 6/1998 | Lin | 6,357,915 B2 | 3/2002 | Anderson |
| 5,812,188 | A | 9/1998 | Adair | 6,402,873 B1 | 6/2002 | Fujii et al. |
| 5,829,884 | A | 11/1998 | Yeager | 6,408,872 B1 | 6/2002 | Skeens et al. |
| 5,839,582 | A | 11/1998 | Strong et al. | 6,423,356 B2 | 7/2002 | Richison et al. |
| 5,873,217 | A | 2/1999 | Smith | 6,520,071 B1 | 2/2003 | Lanza |
| 5,874,155 | A | 2/1999 | Gehrke et al. | 6,799,680 B2 * | 10/2004 | Mak .................. 206/524.8 |
| 5,881,881 | A | 3/1999 | Carrington | 2001/0023572 A1 | 9/2001 | Savage et al. |
| 5,893,822 | A | 4/1999 | Deni et al. | 2003/0070751 A1* | 4/2003 | Bergevin et al. ............ 156/297 |
| 5,898,113 | A | 4/1999 | Vercere | 2004/0000501 A1 | 1/2004 | Shah et al. |
| 5,908,245 | A | 6/1999 | Bost et al. | 2004/0000502 A1 | 1/2004 | Shah et al. |
| 5,915,596 | A | 6/1999 | Credle, Jr. | 2004/0000503 A1 | 1/2004 | Shah et al. |
| 5,927,336 | A | 7/1999 | Tanaka et al. | 2004/0007494 A1 | 1/2004 | Popeil et al. |
| 5,928,762 | A * | 7/1999 | Aizawa et al. ............. 428/156 | | | |

FOREIGN PATENT DOCUMENTS

| | | | |
|---|---|---|---|
| D413,258 | S | 8/1999 | Voller |
| 5,931,189 | A | 8/1999 | Sweeney et al. |
| 5,941,421 | A | 8/1999 | Overman et al. |
| 5,941,643 | A | 8/1999 | Linkiewicz |
| 5,954,196 | A | 9/1999 | Lin |
| 5,957,831 | A | 9/1999 | Adair |
| 5,971,613 | A | 10/1999 | Bell |
| 5,996,800 | A | 12/1999 | Pratt |
| 6,021,624 | A | 2/2000 | Richison et al. |
| 6,023,914 | A | 2/2000 | Richison et al. |
| 6,029,810 | A | 2/2000 | Chen |
| 6,030,652 | A | 2/2000 | Hanus |
| 6,035,769 | A | 3/2000 | Nomura et al. |
| 6,039,182 | A | 3/2000 | Light |
| 6,045,006 | A | 4/2000 | Fraxier et al. |
| 6,045,264 | A | 4/2000 | Miniea |
| 6,053,606 | A | 4/2000 | Yamaguchi et al. |
| D425,786 | S | 5/2000 | Voller |
| 6,059,457 | A | 5/2000 | Sprehe et al. |
| 6,070,728 | A | 6/2000 | Overby et al. |
| 6,074,677 | A | 6/2000 | Croft |
| 6,076,967 | A | 6/2000 | Beaudette |
| 6,077,373 | A | 6/2000 | Fletcher et al. |
| 6,089,271 | A | 7/2000 | Tani |
| 6,105,821 | A | 8/2000 | Christine et al. |
| 6,116,781 | A | 9/2000 | Skeens |
| 6,161,716 | A | 12/2000 | Oberhofer et al. |

| | | | |
|---|---|---|---|
| EP | 0 836 927 | | 4/1998 |
| EP | 1053945 A1 | | 11/2000 |
| JP | 55-090364 | | 7/1980 |
| JP | 62-192779 | | 8/1987 |
| JP | 07-299865 | | 11/1995 |
| JP | 08-009740 | | 4/1996 |
| JP | 09-131846 | | 5/1997 |
| JP | 09-252919 | | 9/1997 |
| JP | 10-034760 | | 2/1998 |
| JP | 10-138377 | | 5/1998 |
| JP | 10-180846 | | 7/1998 |
| JP | 11-34277 | * | 2/1999 |
| JP | 11-077903 | | 3/1999 |
| JP | 11-115142 | | 4/1999 |
| JP | 11-254631 | | 9/1999 |
| JP | 2000-015767 | | 1/2000 |
| JP | 2000-218746 | | 8/2000 |
| KR | UT 248033 | | 5/1995 |
| WO | WO00/71422 | | 11/2000 |
| WO | WO 02/28577 A2 | | 4/2002 |
| WO | WO02066227 | | 8/2002 |
| WO | WO02074522 | | 9/2002 |
| WO | WO2004/078609 | | 9/2004 |

* cited by examiner

FORMING EVACUATION CHANNELS DURING SINGLE AND MULTI-LAYER EXTRUSION PROCESS

CROSS-REFERENCE TO RELATED APPLICATIONS

This application claims the benefit of Henry Wu's co-pending U.S. Provisional Patent Application No. 60/457,496, filed on Mar. 24, 2003, which is incorporated herein by reference.

FIELD OF THE INVENTION

The present invention relates generally to manufacturing of vacuum packaging film, and more particularly to manufacturing patterned vacuum packaging film.

BACKGROUND OF THE INVENTION

Vacuum packaging film is used for vacuum sealing of perishable items. Due to the film's versatility in producing vacuum-sealed packages of various sizes, its popularity has increased in recent years. As a result, continuous product improvement is required on the part of manufacturers in order to stay competitive. However, current methods for producing vacuum packaging film economically fail to meet the requirements of today's demanding marketplace.

Some of these requirements include the ability to produce a multi-layered product embedded with a pattern. Those skilled in the art will readily recognize that the combination of multi-layers and a pattern help to produce a vacuum packaging film that is gas-impermeable, in relation to the contents inside a package, as well as free of trapped air-zones. The presence of the pattern helps to prevent trapped-air-zones when contents are sealed therein.

FIG. 1 illustrates a prior art production line 100 for manufacturing vacuum packaging film. Included is a roll of unprocessed vacuum packaging film 102, roller 104 and patterned wheel 106. Directional arrow 108 indicates how roll 102 is unfurled as roller 104 turns in the direction of arrow 110. As an unfurled sheet 111 of roll 102 passes between roller 104 and patterned wheel 106, wheel 106 also turns as indicated by direction arrow 112. As a result of mechanical pressure, the unfurled portion 111 is embossed with the pattern on patterned wheel 106 and formed into a patterned vacuum packaging film 114.

The process described in FIG. 1 is the typical process for producing vacuum packaging film of a simple nature, it is incapable of producing advanced multi-layered films. Additionally, the pressure and mechanical tear in the embossing process of FIG. 1 generates flaws in the patterned vacuum packaging film 114 that are not desirable.

FIG. 2 illustrates another prior art manufacturing line 200 for manufacturing vacuum packaging film. Included in the manufacturing line 200 is a roll of substrate 202, a single layer extruder 204, a roller 206 and a cooling roller 208 embedded with a reverse pattern. As unfurled substrate 210 is drawn out from roll 202 by rollers 206 and 208, indicated by directional arrows 212, 214 and 216, a plastic melt 218 is exuded from single layer extruder 204 onto the unfurled substrate 210. As the melt 218 and unfurled substrate 210 passes over cooling roller 208, the melt 218 solidifies and is simultaneously embedded, along with the unfurled substrate 210, by the inverse pattern located on cooling roller 208. As a result, multi-layered/patterned vacuum packaging film 220 emerges.

While manufacturing line 200 is capable of producing a two-layered patterned film. In order to produce additional layers, further manufacturing steps must be taken. Additionally, flowing a patterned layer onto an already formed layer may still result in structural flaws within the patterned film 220. The process of FIG. 2 is disclosed in more detail in Lee's commonly assigned published patent application US 2003/0155269, which publication is incorporated herein by reference in its entirety.

Accordingly, what is needed is a method and apparatus to manufacture vacuum packaging film having multiple layers of substantially improved structure in an easy to manufacture and therefore economical process.

SUMMARY OF THE INVENTION

The present invention fills these needs by providing a multi-layer extruder that is capable of producing a plastic melt that congeals into multiple layers. In combination with a pattern-producing tool, a pattern can then be imprinted as the melt passes over it. As a result, a multi-layer patterned vacuum packaging film can be produced.

A method for making a vacuum packaging film, in accordance with an embodiment of the present invention, includes flowing a plastic melt, from a multi-layer extruder, onto a rotating roller. The plastic melt is then cooled while simultaneously imparting a pattern, via a pattern imparting means, onto the plastic melt resulting in the vacuum packaging film.

A method for making a vacuum packaging film, in accordance with another embodiment of the present invention, includes flowing a plastic melt, from a multi-layer extruder, onto a rotating cooling roller. The plastic melt is then cooled, on the rotating cooling roller, into the vacuum packaging film.

A method for making vacuum packaging film, in accordance with yet another aspect of the present invention, includes flowing a plastic melt, from a multi-layer extruder, onto a cooling plank. The plastic melt is then cooled, as it flows over the cooling plank, into a vacuum packaging film.

A method for making vacuum packaging film, in accordance with yet another embodiment of the present invention, includes flowing a plastic melt, from a multi-layer extruder, in the vicinity of an air-knife. The plastic melt is then cooled, as it flows in the vicinity of the air-knife, into a vacuum packaging film.

An apparatus for producing a vacuum packaging film, in accordance with a final embodiment of the present invention, includes a multi-layer extruder for producing a plastic melt. Also included is a pattern imparting means for imprinting a pattern onto the plastic melt as it congeals into the vacuum packaging film.

An advantage of the present invention is that a multi-layer, patterned vacuum packaging film can be produced economically and yet still meet necessary demanding technical requirements. Additionally, the use of an air-knife, or conversely the inverse vacuum, enables custom patterns to be easily implemented as opposed to changing a roller embedded with an inverse pattern.

These and other advantages of the present invention will become apparent to those skilled in the art after reading the following descriptions and studying the various figures of the drawings.

DETAILED DESCRIPTION OF THE INVENTION

Figure 1:
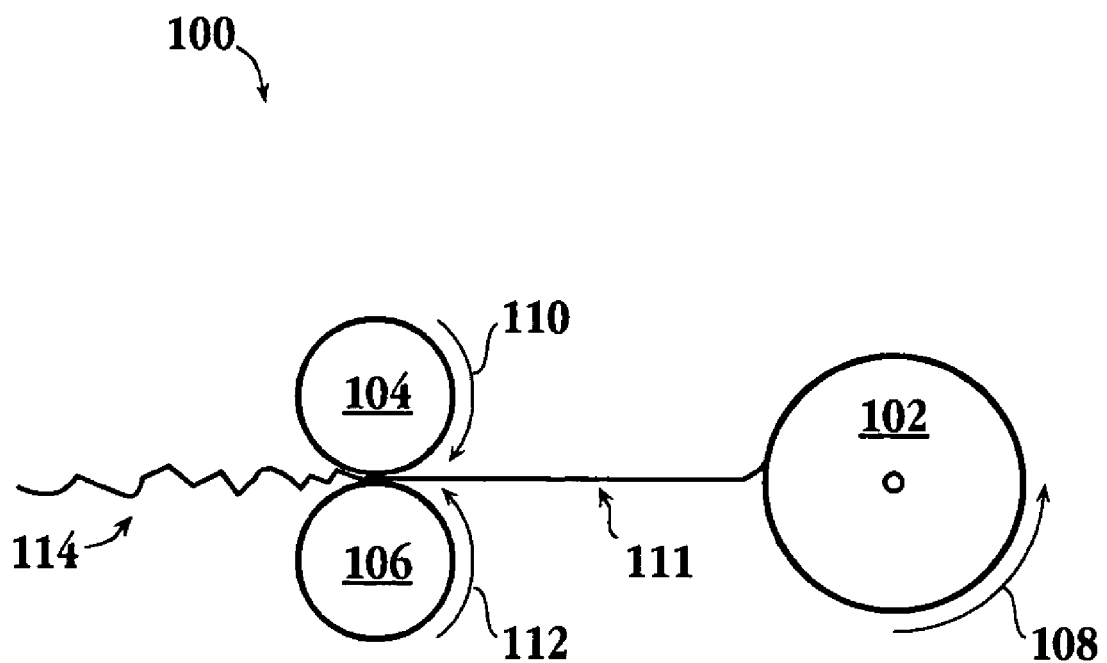
FIG. 1 illustrates a prior art method for manufacturing vacuum packaging film.
Figure 2:
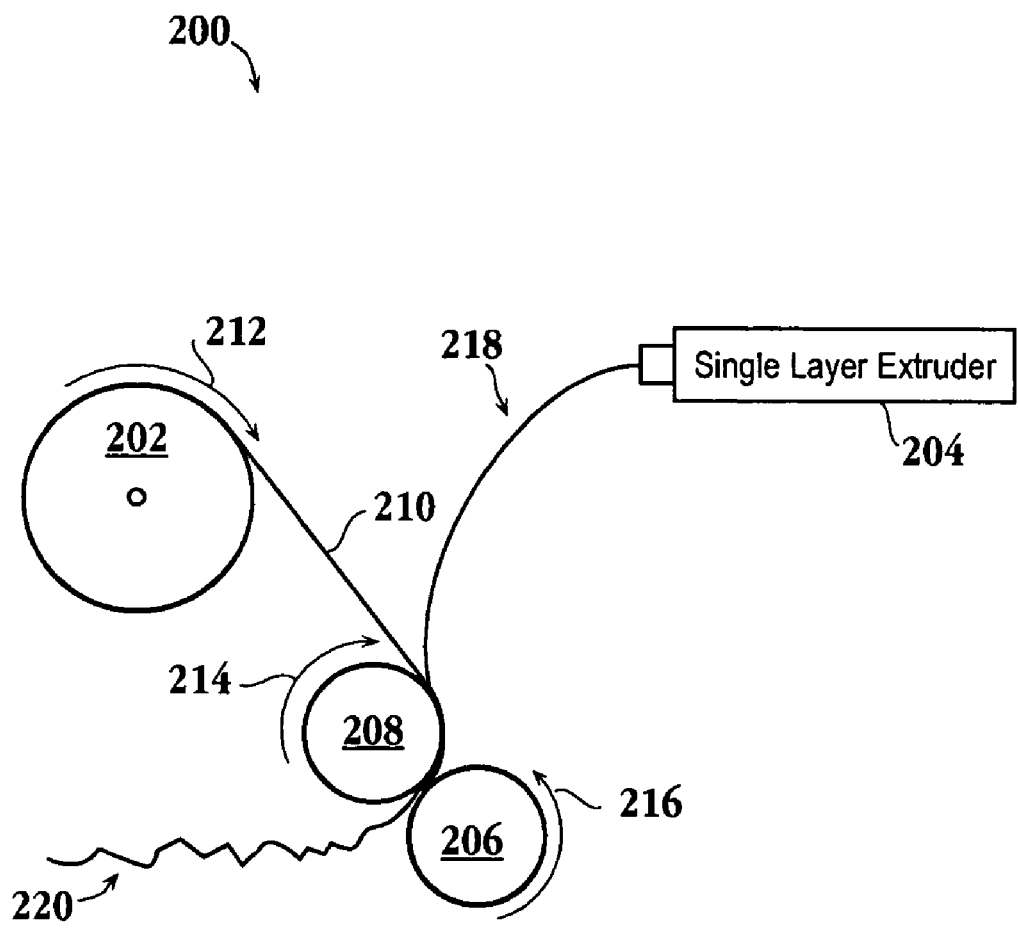
FIG. 2 illustrates another prior art method for manufacturing vacuum packaging film.

FIGS. 1-2 were described in reference to the prior art. The present invention provides a method and apparatus for economically producing a multi-layer, patterned vacuum packaging film. By utilizing a multi-layer extruder, as opposed to the single-layer extruder of the prior art, with a variety of patterning techniques, the desired vacuum packaging film is achieved. The patterning techniques include using a patterned cooling roll, a patterned cooling plank, an air-knife and an inverse-vacuum. These techniques will be now be described. It should be kept in mind that certain extraneous details were left out of the subsequent description in an effort to not unnecessarily obscure the true spirit and scope of present invention.

Figure 3:
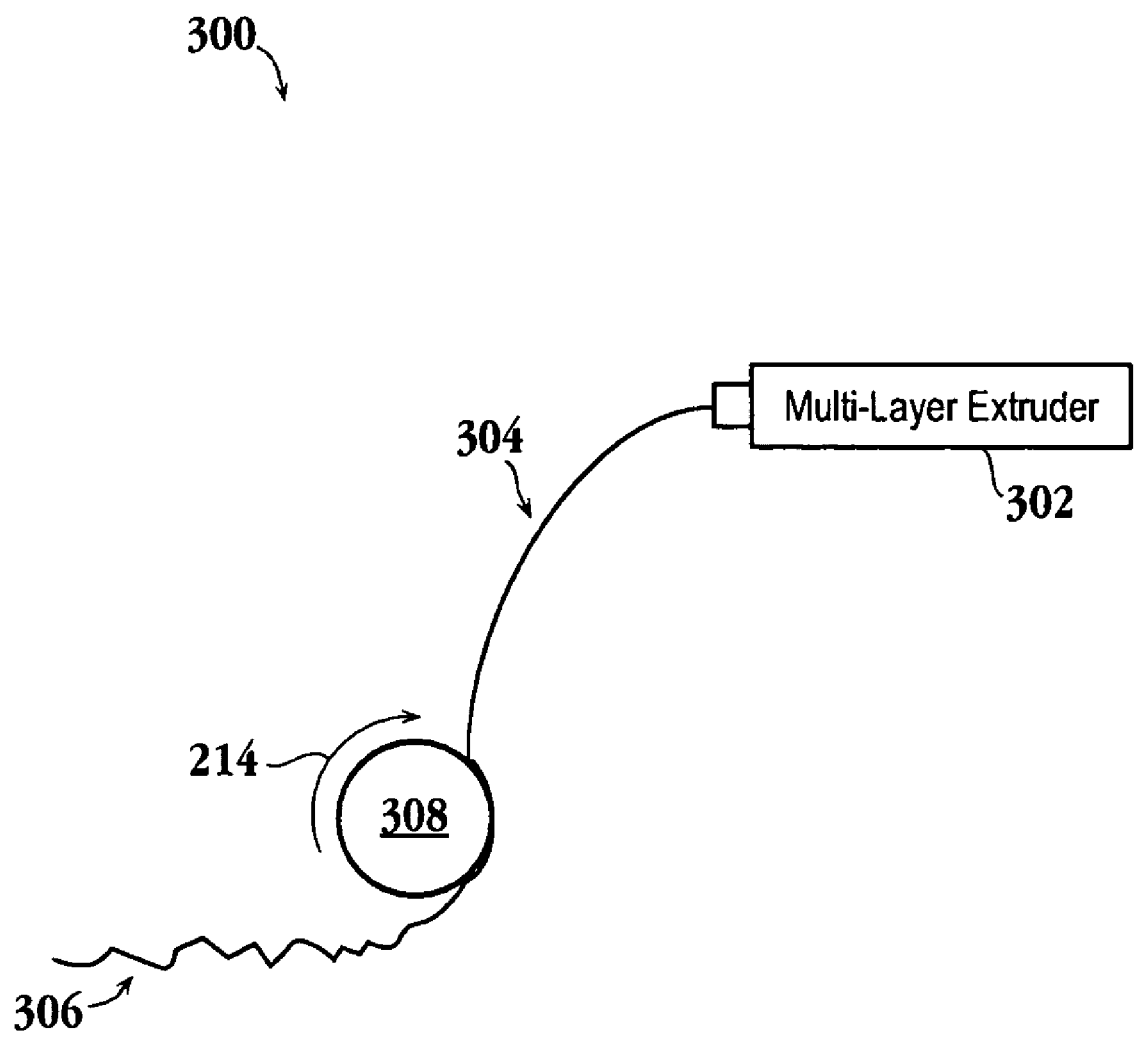
FIG. 3 illustrates an apparatus for manufacturing vacuum packaging film utilizing a multi-layer extruder, in accordance with the present invention.

FIG. 3 illustrates an apparatus 300 for manufacturing vacuum packaging film in accordance with one embodiment of the present invention. The apparatus 300 includes a multi-layer extruder 302 and a patterned cooling roller 308 embedded with a reverse pattern. The multi-layer extruder 302 is capable of extruding layers as required by the specific application. One suitable layer configuration is described below in more detail with reference to FIG. 15. although at least one improved pattern is described below with reference to FIG. 16. As the multi-layer extruder 302 extrudes a plastic melt 304, the plastic melt 304 flows into contact with the cooling roller 208 turning in the direction of an arrow 214. As the melt 304 is cooled, a pattern is also formed on the melt 304 at the same time due to the presence of the inverse-pattern. As a result, a multi-layer vacuum packaging film 306 emerges.

As will be appreciated, the apparatus 300 may include a variety of other mechanisms useful in facilitating manufacture. For example, the apparatus 300 may include a temperature control device for controlling the cooling temperature of the cooling roller 208. The apparatus 300 may include motor controls for adjusting and controlling rotation speed of the cooling roller 208.

The apparatus 300 may include a laminating roll that through mechanical pressure applies the melt 304 onto the pattern of the cooling roller 208. Generally a cooling roll diameter is larger than a laminating roll diameter, 150% to 300% is suitable, but this may be implemented as desired.

The pattern may take on a variety of shapes including an uneven pattern, a random pattern, a wave pattern, a striped pattern, or a zigzag pattern. This pattern may be formed in any manner on the cooling roller 208, including on the entirety of the cooling roller 208, or may be disposed in stripes or randomly. The zigzap pattern in particular is described in more detail below with reference to FIG. 17.

Figure 4:
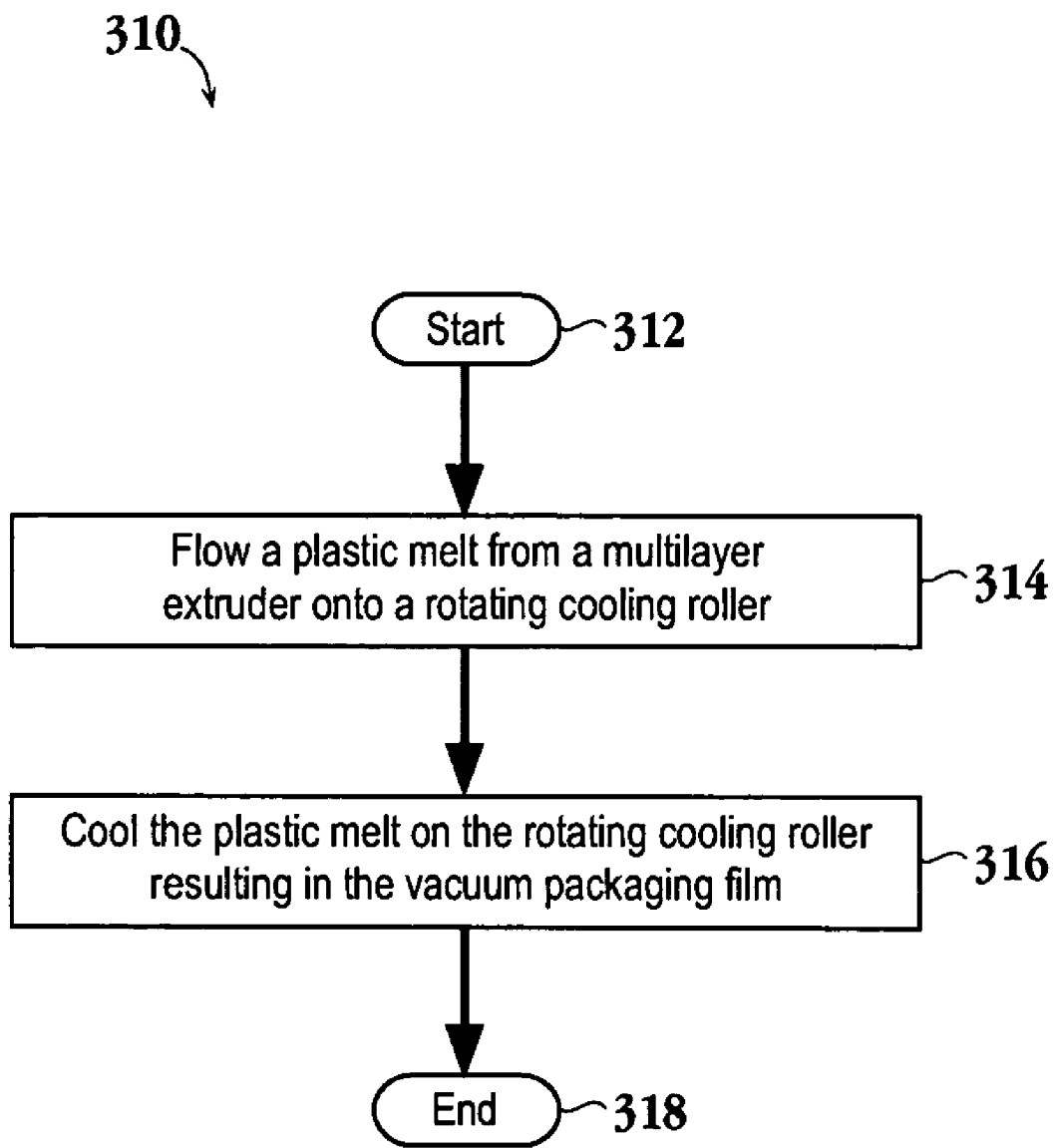
FIG. 4 is a flowchart illustrating a method for manufacturing vacuum packaging film utilizing a multi-layer extruder, in accordance with the present invention.

FIG. 4 is a flowchart illustrating a method 310 for manufacturing vacuum packaging film utilizing a multi-layer extruder, in accordance with the present invention. As will be appreciated, multi-layer films of the prior art were formed through embossing multiple layers together. In the method 310, multi-layer films are formed through a multi-layer extrusion process. After a start operation 312 prepares material as necessary, a plastic melt is flowed from a multi-layer extruder onto a rotating cooling roller, at step 314. At step 316, the plastic cools on the rotating cooling roller and turns into the vacuum packaging film. The process then ends at a step 318 where additional manufacturing may be performed. As will be appreciated, patterning can be performed later if desired, or as next described in FIG. 5, the cooling roller can be patterned and thus the film is formed with a pattern during the extrusion process.

Figure 5:
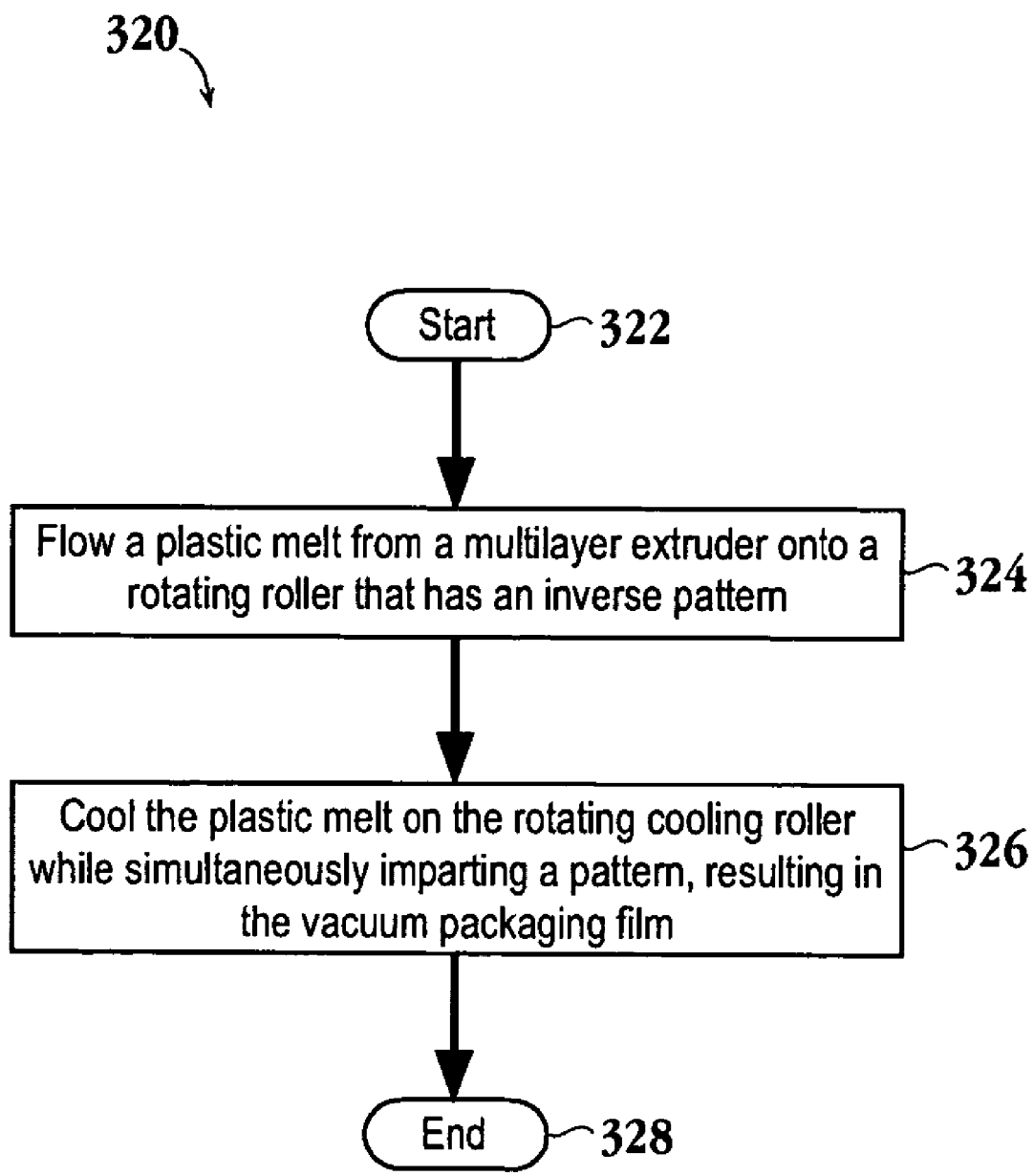
FIG. 5 is a flowchart illustrating a method for manufacturing vacuum packaging film utilizing a multi-layer extruder, in accordance with the present invention.

FIG. 5 is a flowchart illustrating a method 320 for manufacturing a patterned vacuum packaging film utilizing a multi-layer extruder, in accordance with the present invention. After a start step 322, a plastic melt, generated by a multi-layer extruder, is flowed onto a patterned rotating cooling roller at step 324. The rotating roller has an inverse pattern embedded on it. As the melt is cooled on the cooling roller, the inverse pattern imparts a pattern onto the congealing melt that solidifies into a patterned multi-layer vacuum packaging film, at step 326. The process then ends at step 328.

Figure 6:
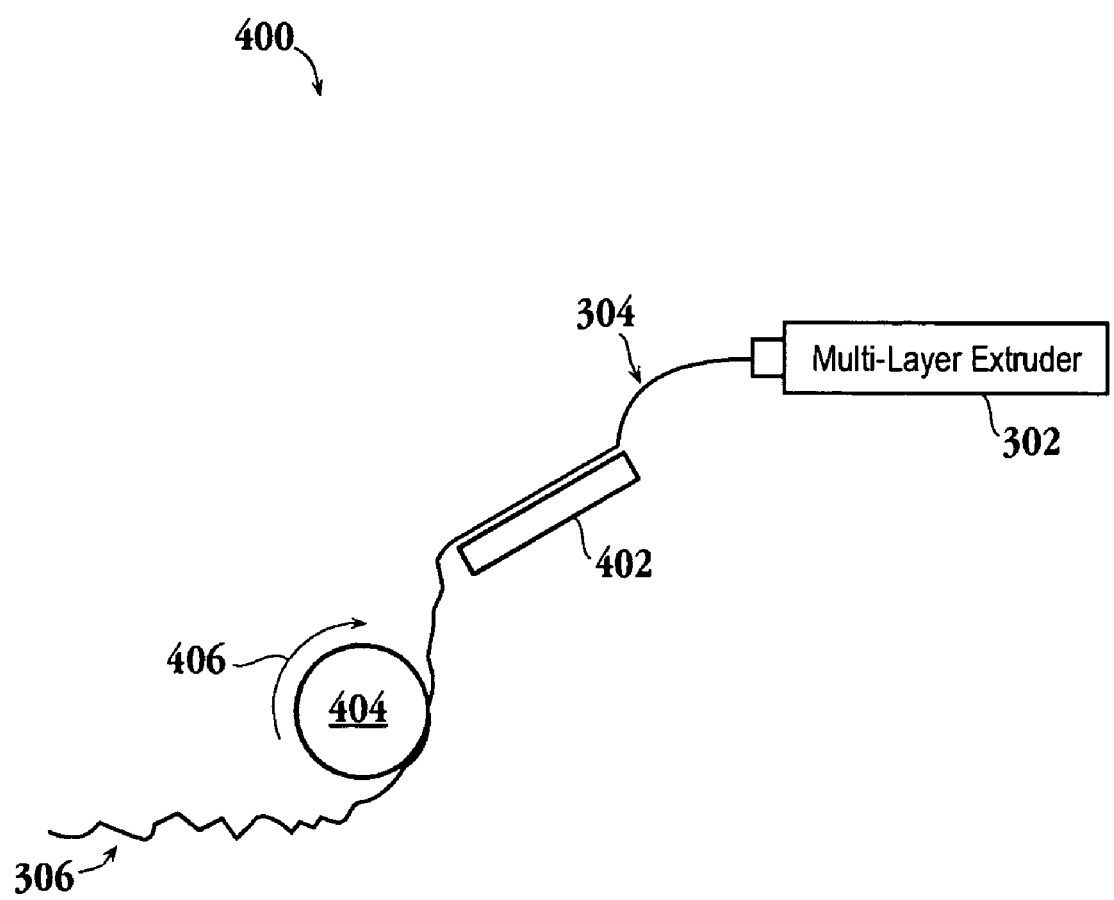
FIG. 6 illustrates an apparatus for manufacturing vacuum packaging film utilizing a multi-layer extruder and a cooling plank, in accordance with the present invention.

FIG. 6 illustrates an apparatus 400 for manufacturing a multi-layer patterned vacuum packaging film in accordance with another embodiment of the present invention. The apparatus 400 includes a multi-layer extruder 302, a patterned cooling plank 402, and a cooling roller 404 that rotates in the direction of arrow 406. As the plastic melt 304 flows along cooling plank 402, the melt 304 congeals and is simultaneously imprinted with the inverse of the pattern present on the cooling plank 402. As a result, a multi-layered, patterned vacuum packaging film 306 emerges, as roller 404 pulls along the film 306. Again, the apparatus 400 may include a laminating roll applied on the plank 402 and/or on the cooling roller 404. There may also be additional temperature and/or speed controls.

Figure 7:
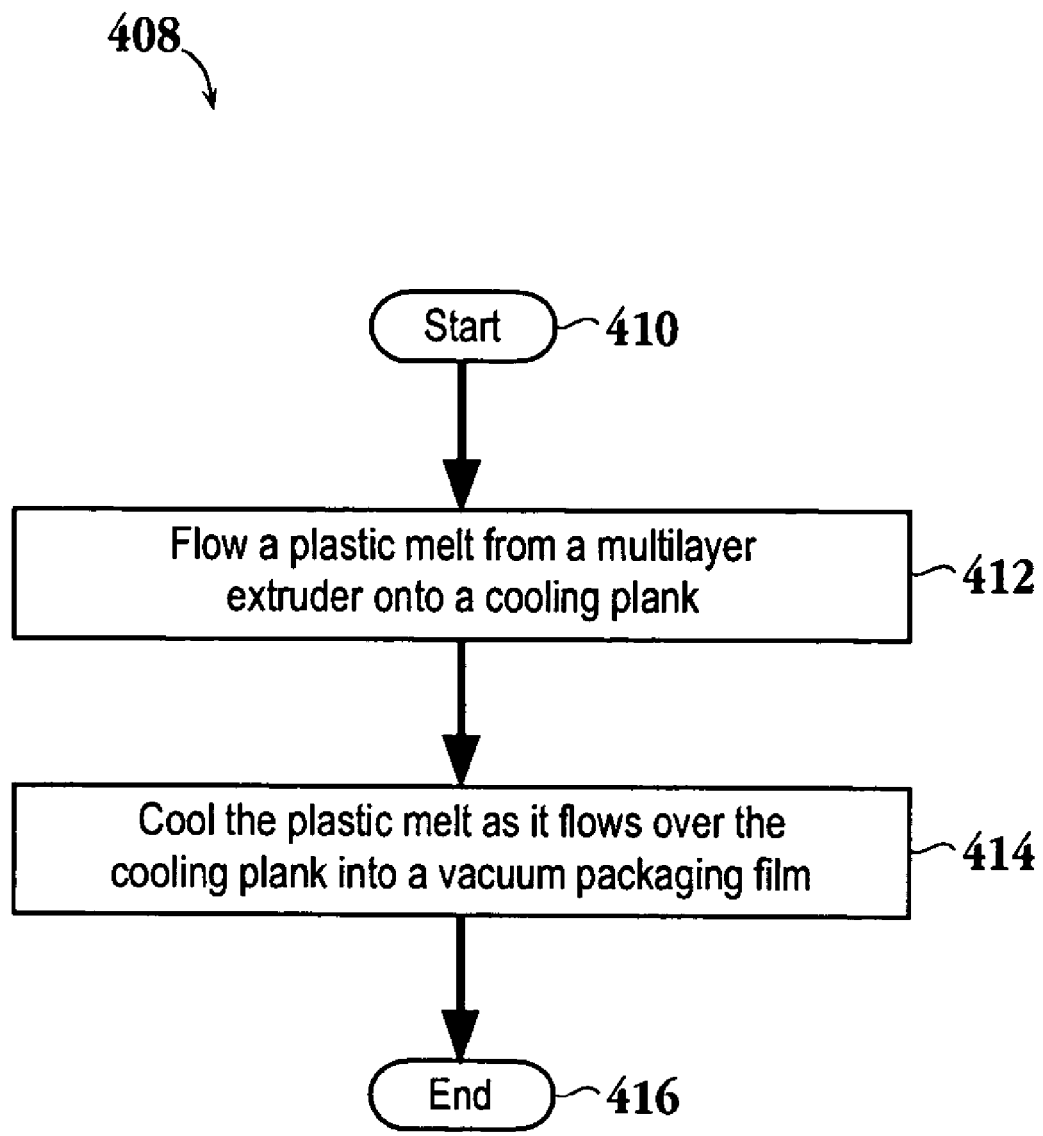
FIG. 7 is a flowchart illustrating a method for manufacturing vacuum packaging film utilizing a multi-layer extruder and a cooling plank, in accordance with the present invention.

FIG. 7 is a flowchart illustrating a method 408 for manufacturing vacuum packaging film utilizing a multi-layer extruder and a cooling plank, in accordance with the present invention. After a beginning step 410, a plastic melt is flowed from a multi-layer extruder onto a cooling plank at step 412. The melt cools as it flows over the cooling plank and forms a vacuum packaging, at step 414. As will be appreciated, a roller or other source of motion must be used to maintain flow of the plastic melt across the cooling plank. The process finishes at step 416.

Figure 8:
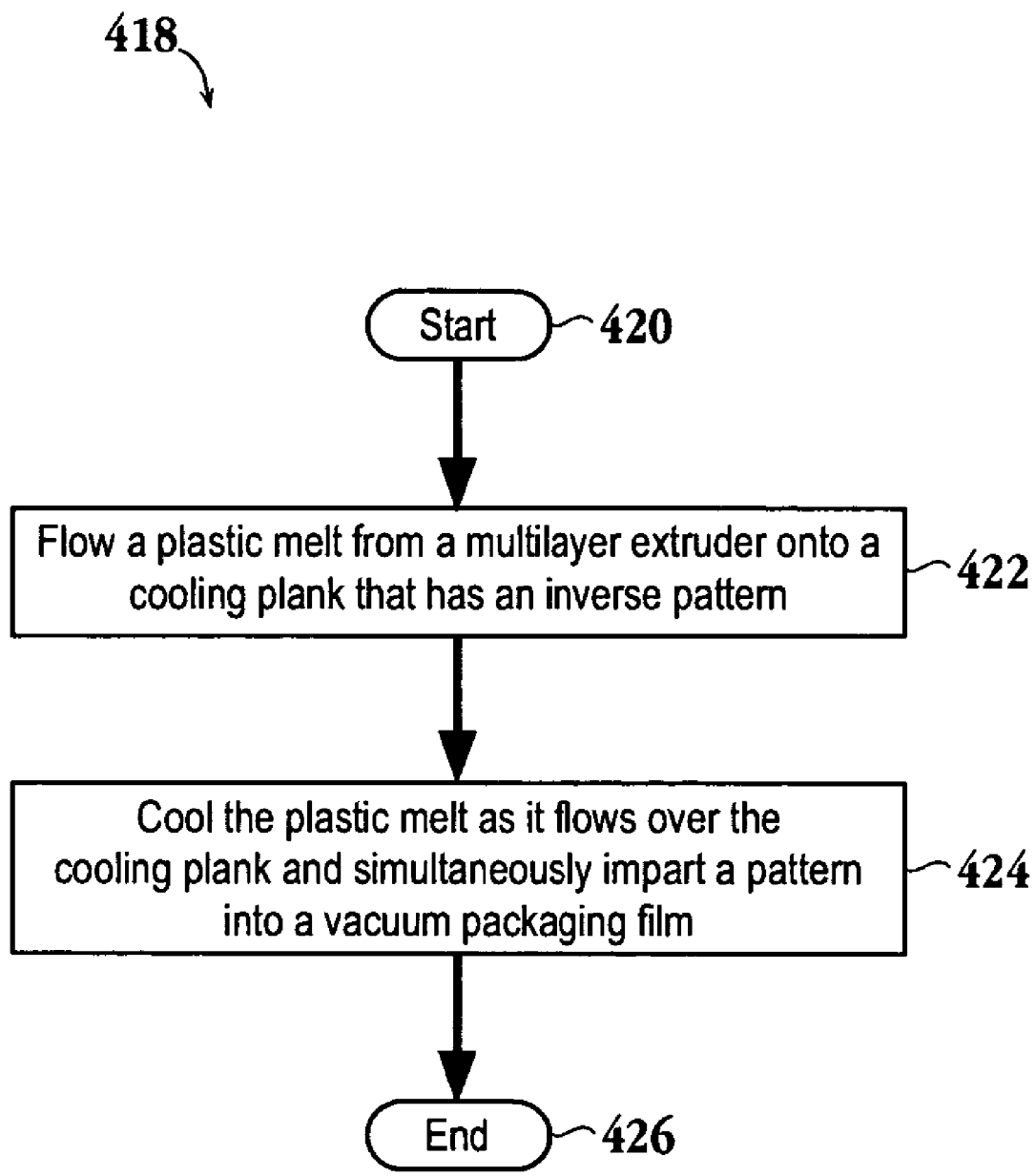
FIG. 8 is a flowchart illustrating a method for manufacturing vacuum packaging film utilizing a multi-layer extruder and a cooling plank, in accordance with the present invention.

FIG. 8 is a flowchart illustrating a method 418 for manufacturing a multi-layer patterned vacuum packaging film utilizing a multi-layer extruder and a cooling plank, in accordance with the present invention. After start 420, a multi-layer extruder forms a plastic melt that flows out onto a patterned cooling plank, at step 422. The cooling plank has an inverse pattern on it that imparts a pattern onto the melt as it flows over the plank and forms a vacuum packaging film, at step 424. The process terminates at step 426.

Figure 9:
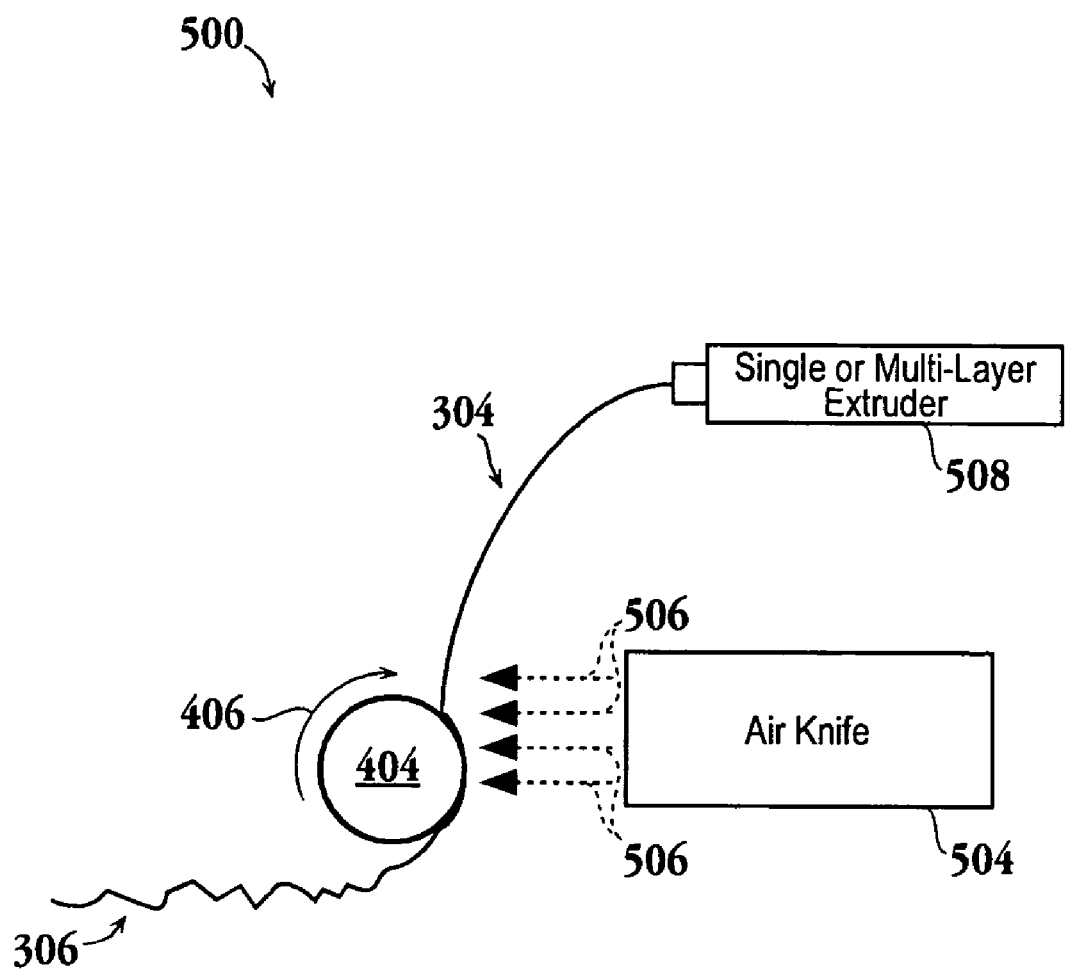
FIG. 9 illustrates an apparatus for manufacturing vacuum packaging film utilizing a multi-layer extruder and an air-knife, in accordance with the present invention.

FIG. 9 illustrates an apparatus 500 for manufacturing vacuum packaging film utilizing a single or multi-layer extruder and an air-knife, in accordance with the present invention. The apparatus 500 includes a single or multi layer extruder 508, an airknife 504, and a cooling roller 404 that turns in the direction of arrow 406. As the plastic melt 304 flows onto roller 404, the air-knife 504 selectively etches a pattern onto the melt 304 with controlled blasts of air 506. Additionally, blasts of air 506 also cause the melt 304 to congeal into multi-layered, patterned vacuum packaging film 306 that is pulled along by roller 404, in the instance where extruder 508 is a multi-layer extruder 508. If a single layer extruder 508 is used, a single layer, patterned vacuum packaging film 306 is produced.

Figure 10:
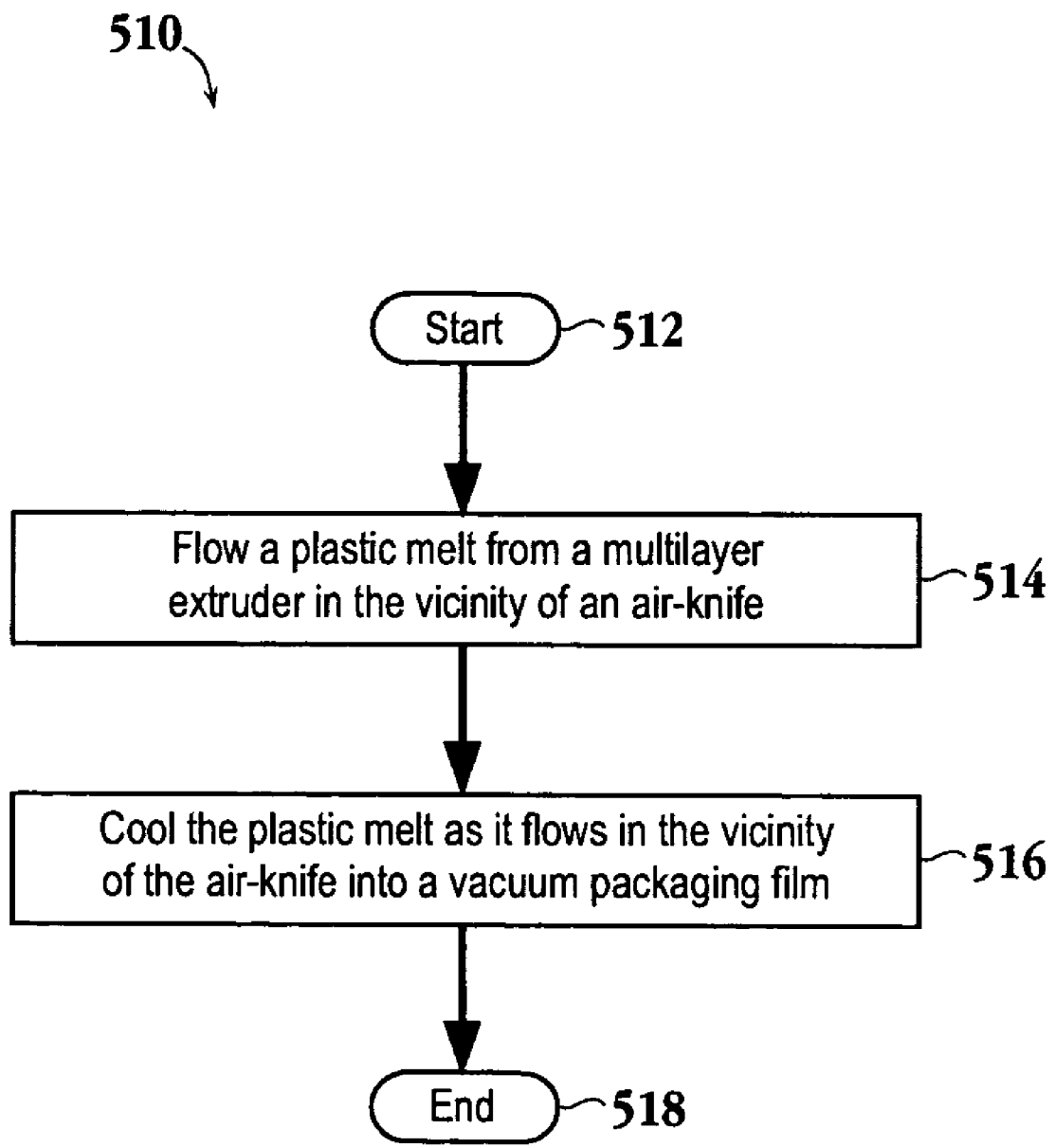
FIG. 10 is a flowchart illustrating a method for manufacturing vacuum packaging film utilizing a multi-layer extruder and an air-knife, in accordance with the present invention.

FIG. 10 is a flowchart illustrating a method 510 for manufacturing vacuum packaging film utilizing a multi-layer extruder and an air-knife, in accordance with the present invention. The method begins at step 512 and proceeds to step 514 where a plastic melt is flowed from a multi-layer extruder, in the vicinity of an air-knife. At step 516, the air-knife cools the plastic melt and a vacuum packaging film results. Step 518 terminates the process.

Figure 11:
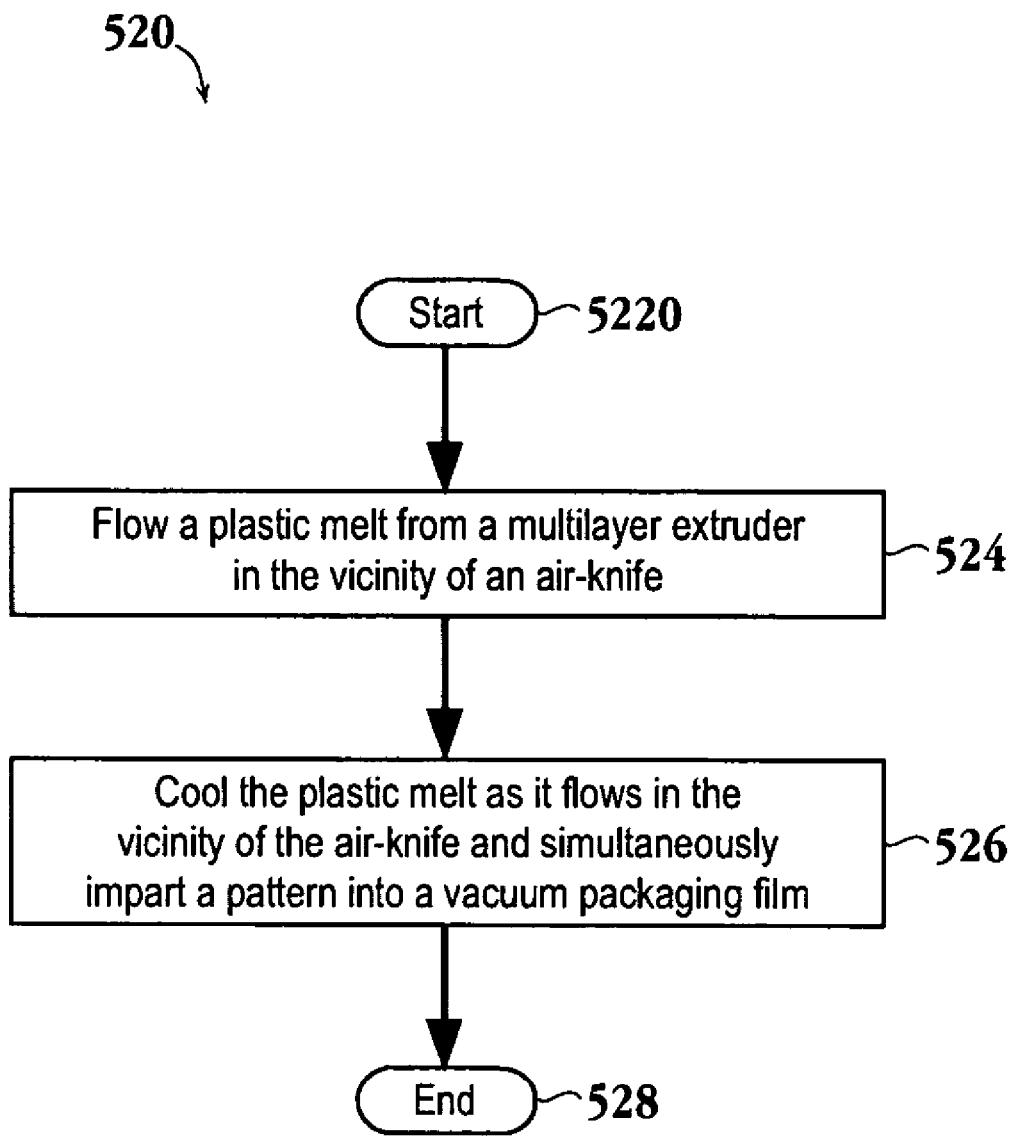
FIG. 11 is a flowchart illustrating a method for manufacturing vacuum packaging film utilizing a multi-layer extruder and an air-knife, in accordance with the present invention.

FIG. 11 is a flowchart illustrating a method 520 for manufacturing patterned multi-layer vacuum packaging film utilizing a multi-layer extruder and an air-knife, in accordance with the present invention. After start 522, a plastic melt flows from a multi-layer extruder in the vicinity of an air-knife at step 524. A pattern is then formed in the melt by the air-knife as it is cooled into a vacuum packaging film, at step 526. The process then ends at 528.

Figure 12:
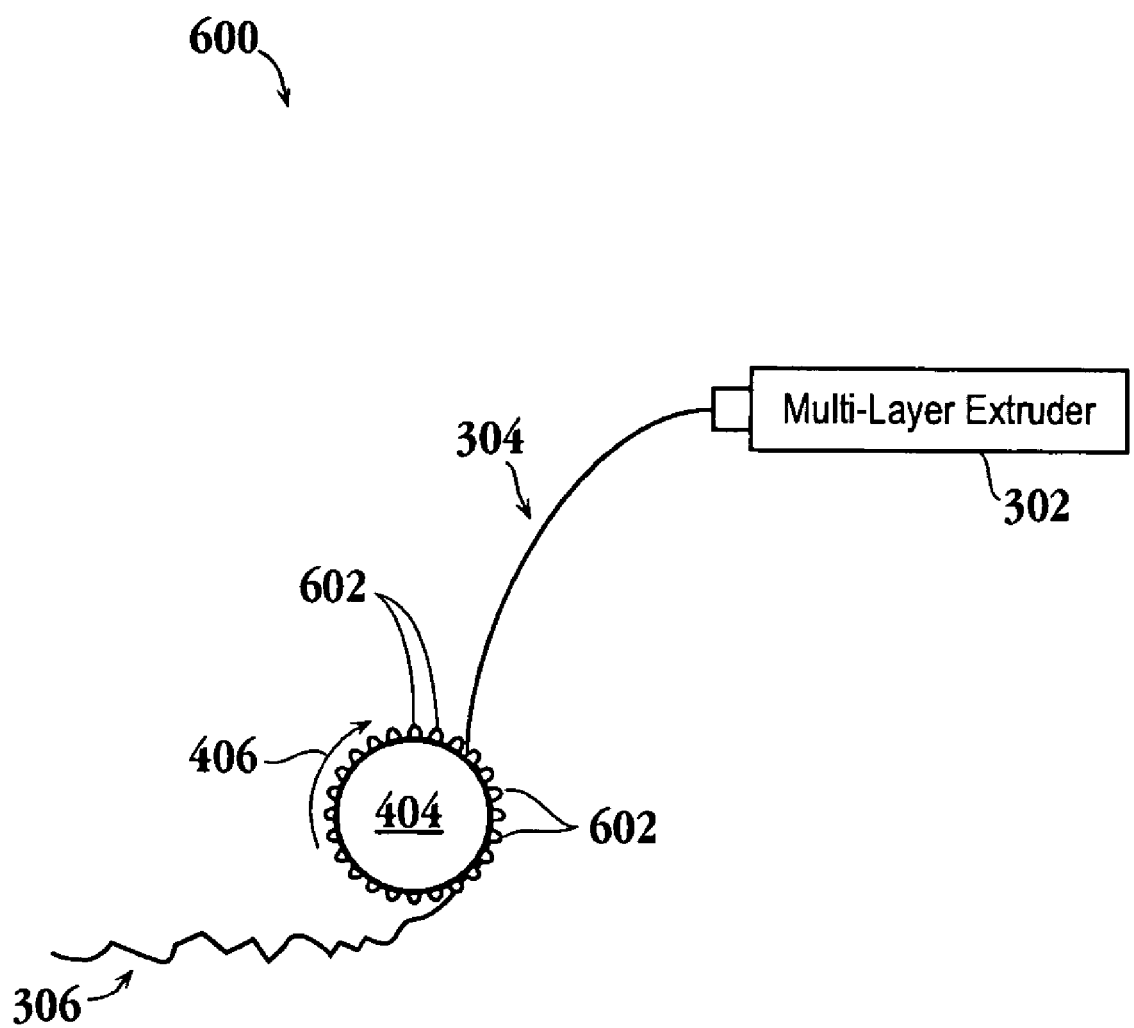
FIG. 12 illustrates an apparatus for manufacturing vacuum packaging film utilizing a multi-layer extruder and an inverse-vacuum, in accordance with the present invention.

FIG. 12 illustrates an apparatus 600 for manufacturing vacuum packaging film utilizing in accordance with one embodiment of the present invention. The apparatus 600 includes a multi-layer extruder 302 and a cooling roller 404 having an inverse-vacuum 602. As the plastic melt 304 flows onto the cooling roller 404, the inverse-vacuum 602 selectively "pulls" a pattern onto the melt 304. Additionally, inverse vacuum 602 causes the melt 304 to congeal into multi-layered, patterned vacuum packaging film 306 that is pulled along by roller 404 in the direction of the rotation 406. Alternatively, the pattern may be formed geometrically on the cooling roller 404 and the inverse vacuum 602 may simply hold the plastic melt 304 onto the patterned roller 404.

Figure 13:
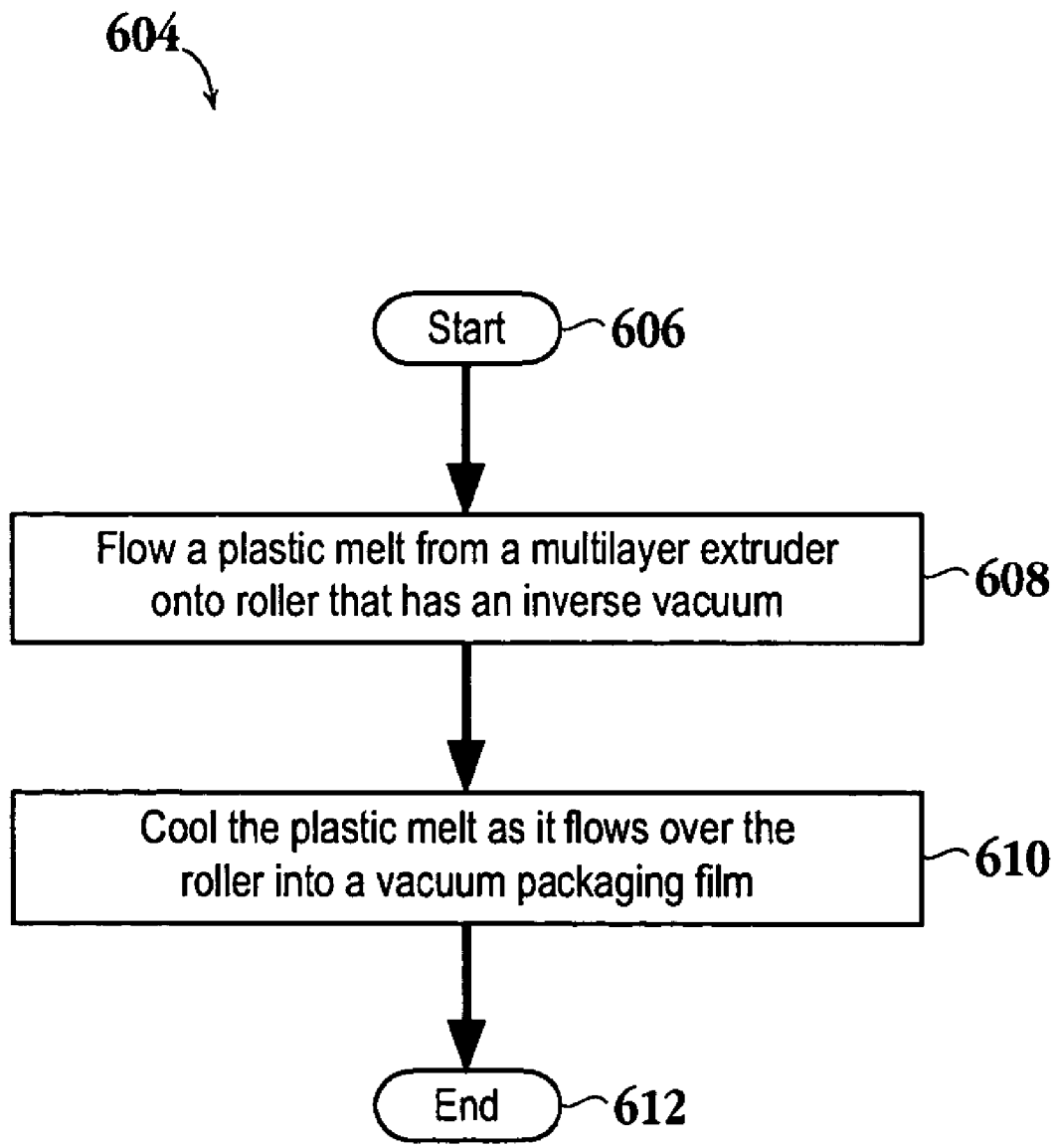
FIG. 13 is a flowchart illustrating a method for manufacturing vacuum packaging film utilizing a multi-layer extruder and an inverse-vacuum, in accordance with the present invention.

FIG. 13 is a flowchart illustrating a method 604 for manufacturing vacuum packaging film utilizing a multi-layer extruder and an inverse-vacuum, in accordance with the present invention. After start 606, a plastic melt is flowed from a multi-layer extruder onto a roller with an inverse vacuum at step 608. The melt then cools as it flows over the roller and turns into a vacuum packaging film at step 610. At 612, the process ends.

Figure 14:
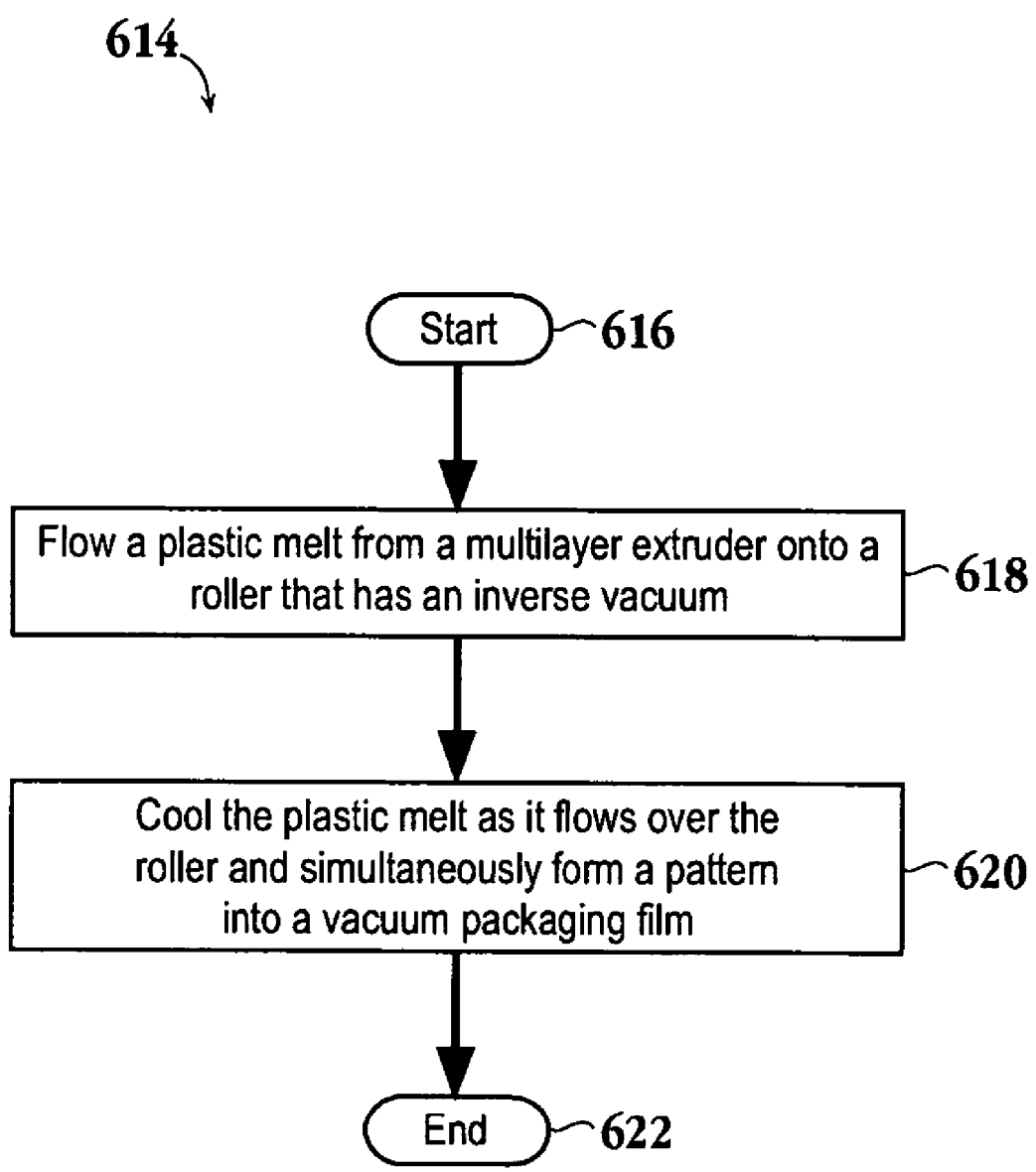
FIG. 14 is a flowchart illustrating a method for manufacturing vacuum packaging film utilizing a multi-layer extruder and an inverse-vacuum, in accordance with the present invention.

FIG. 14 is a flowchart 614 illustrating a method for manufacturing vacuum packaging film utilizing a multi-layer extruder and an inverse-vacuum, in accordance with the present invention. The method begins at 616 and proceeds to step 618 where a plastic melt is produced from a multi-layer extruder onto a roller with an inverse-vacuum. The melt then cools as it flows over the roller and is simultaneously imprinted with a pattern due to the presence of the inverse vacuum at selected points of the roller. As a result of the preceding, a vacuum packaging film is formed at step 622. The process then terminates at step 622.

Figure 15:
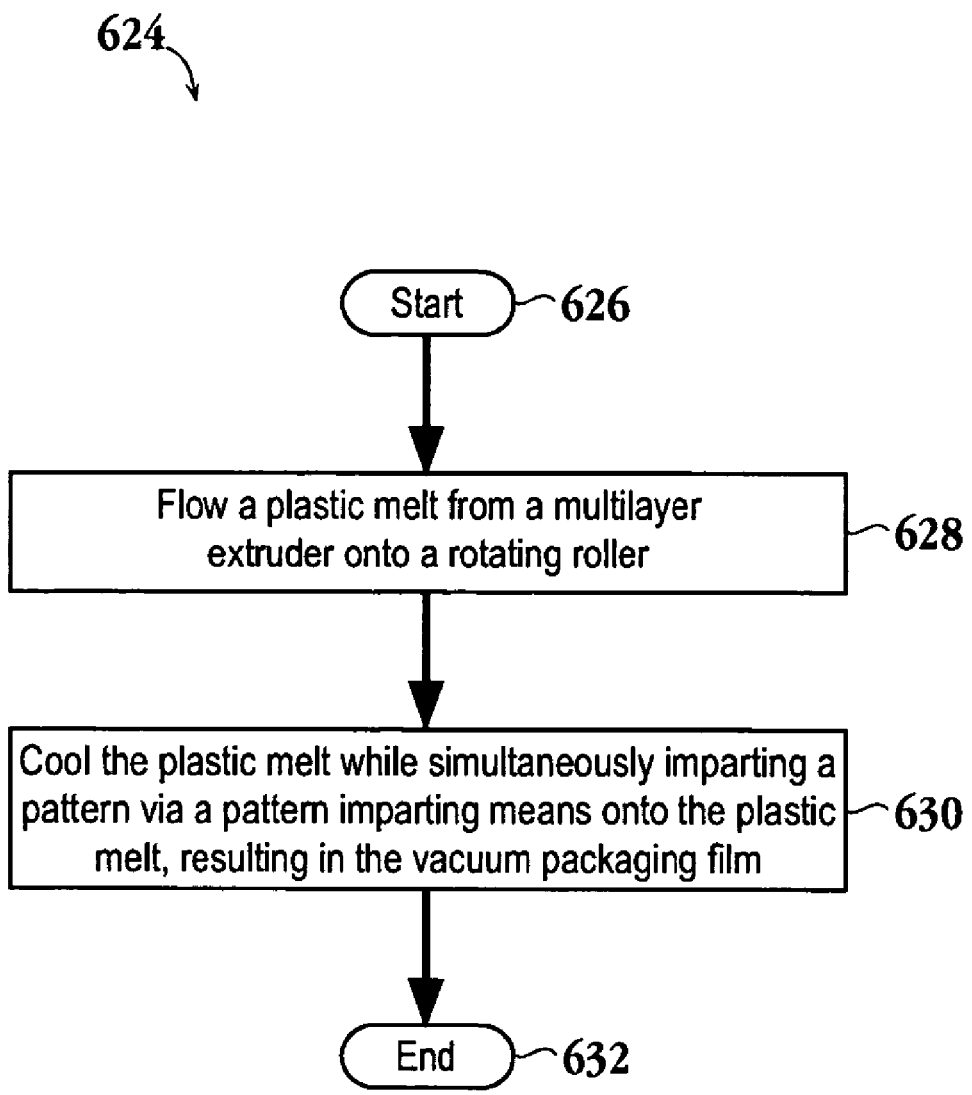
FIG. 15 is a flowchart illustrating a method for manufacturing vacuum packaging film utilizing a multi-layer extruder, a rotating roller and a pattern imparting means, in accordance with the present invention.

FIG. 15 is a flowchart 700 illustrating a method for manufacturing vacuum packaging film utilizing a multi-layer extruder, a rotating roller and a pattern imparting means, in accordance with the present invention. After start 702, a multi-layer extruder forms a plastic melt that is flowed over a roller at step 704. The melt is then cooled and simultaneously imprinted with a pattern, at step 706, to form a vacuum packaging film. The pattern is delivered via a pattern imprinting means. The process then ends at step 708.

Figure 16:
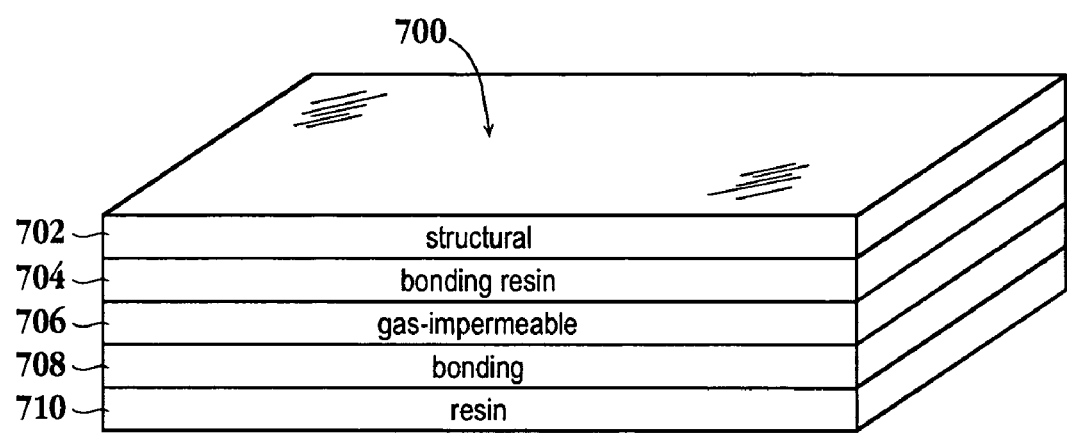
FIG. 16 illustrates a cross-section of a vacuum packaging film sheet in accordance with one embodiment of the present invention.

Turning next to FIG. 16, a vacuum packaging film 750 in accordance with one embodiment of the present invention will now be described. The vacuum packaging film 750 includes a structural layer 752, a bonding resin layer 754, a gas impermeable layer 756, a bonding resin layer 758, and a heat-sealable resin layer 760. The structural layer 752 acts to provide strength to the vacuum packaging film 750. The gas impermeable layer 756 acts as a barrier layer to prevent gas entry once the vacuum packaging film 750 has been converted into a bag. The heat-sealable resin layer 760 is the internal bag layer which when coupled with an opposing layer and heated can form a vacuum seal.

Figure 17:
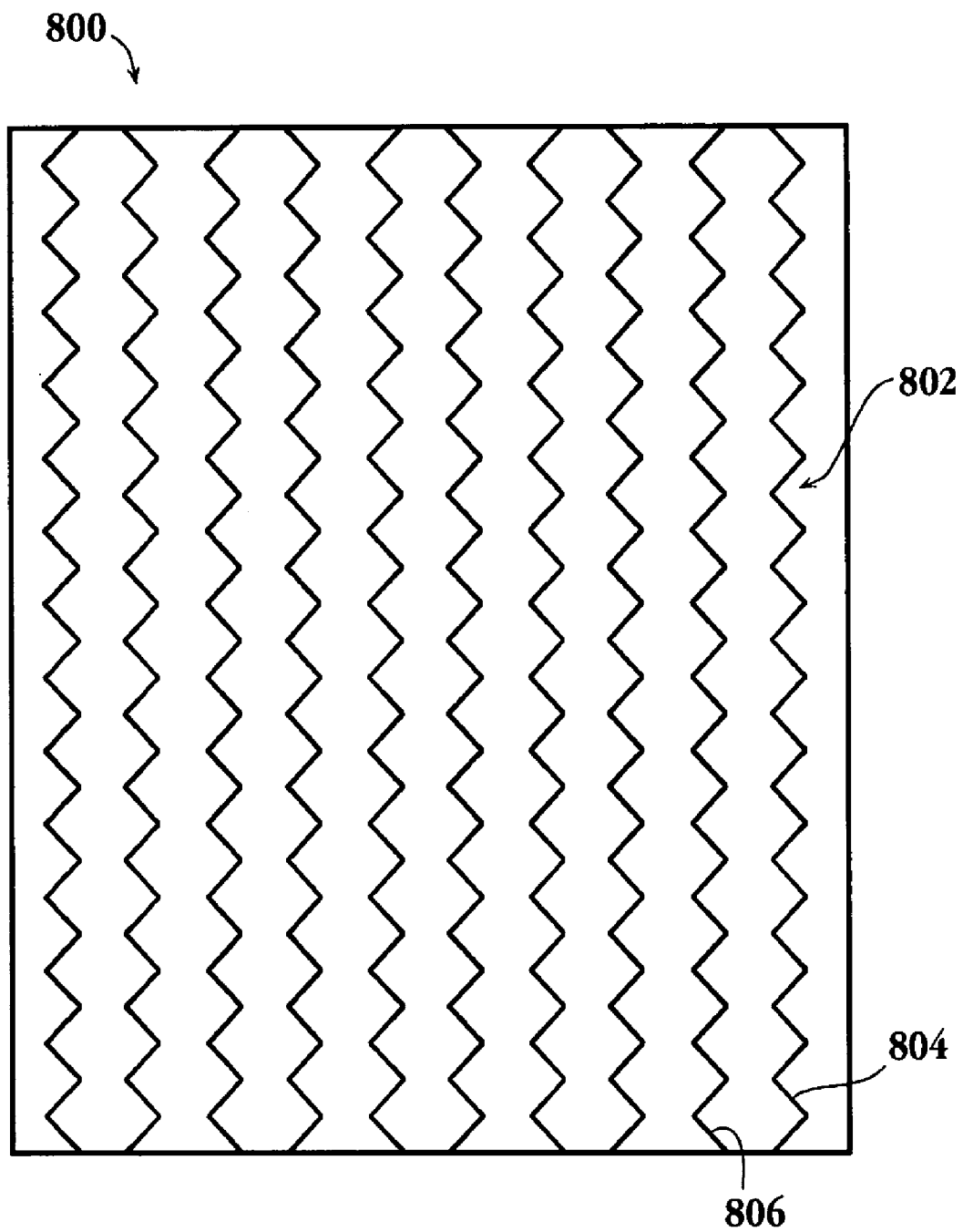
FIG. 17 illustrates a vacuum packaging film sheet having a zigzag pattern in accordance with yet another embodiment of the present invention.

With reference to FIG. 17, a vacuum packaging film 800 in accordance with one embodiment of the present invention will now be described. The notable feature of vacuum packaging film 800 is the zigzag pattern 802 formed on or within the vacuum packaging film 800. The zigzag pattern 802 consists of opposing zigzag channels or ridges having an opposing patter such as lines 804 and 806. The zigzag pattern 802 can be formed onto the vacuum packaging film 800 through actually forming additional film material onto the vacuum packaging film 800. This can be accomplished by any suitable mechanism such as the extrusion processes described above in more detail. Alternately, a pressure embossing process may be utilized to form the zigzag pattern 802 into the vacuum packaging film 800.

The zigzag pattern 802 provides a variety of benefits. In particular, the varying size of channels formed by the zigzag pattern 802 retards fluid flow during vacuum evacuation of a vacuum packaging bag formed from the vacuum packaging film 800.

Figure 18:
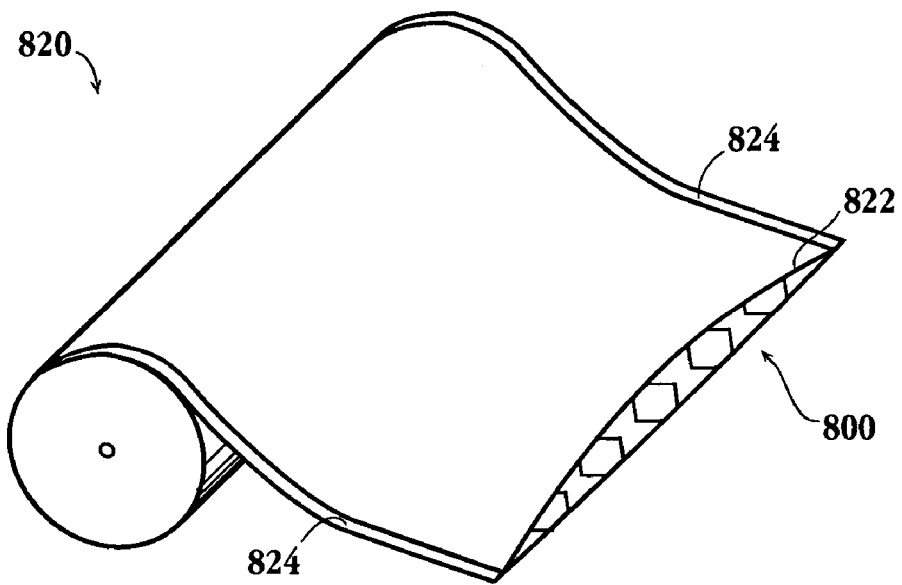
FIG. 18 illustrates a bag roll of vacuum packaging material having a zigzag pattern in accordance with the present invention.

FIG. 18 illustrates a bag roll 820 of vacuum packaging material in accordance with yet another embodiment of the present invention. The bag roll 820 includes a first sheet of patterned film 800, a second sheet of film 822, and heat sealed opposing sides 824. The bag roll 820 is useful by those such as end consumers in creating vacuum packaging bags of varying sizes. The patterned film sheet 800 may have a zigzag or other type of pattern. The second film sheet 822 may be formed with or without patterns, either way the pattern of the film sheet 800 aids in evacuation by forming airchannels during vacuum evacuation.

Figure 19:
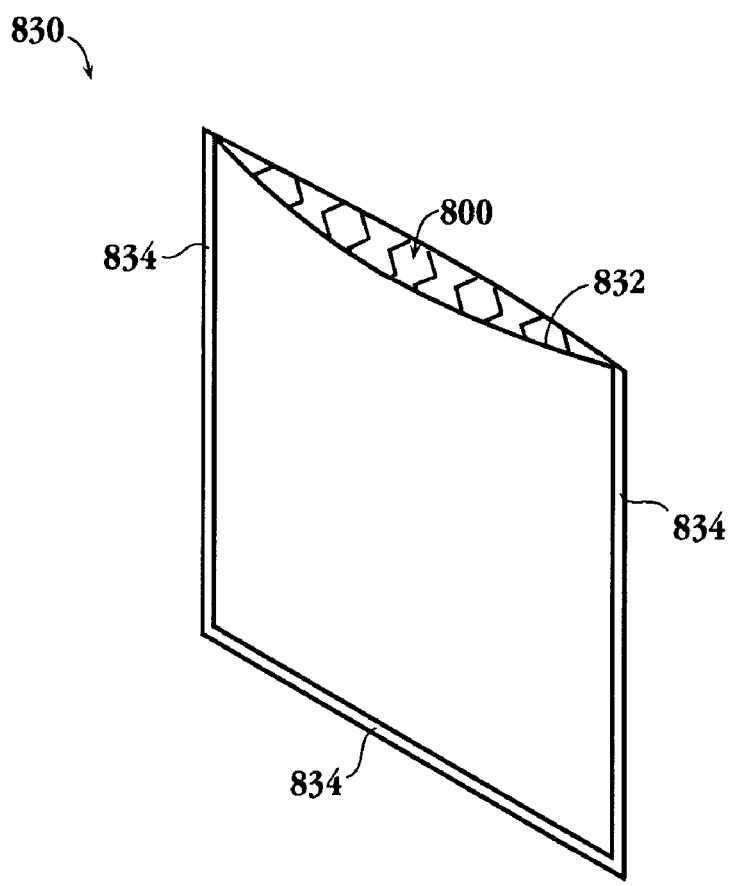
FIG. 19 illustrates a preformed vacuum packaging receptacle having a zigzag pattern in accordance with the present invention.

FIG. 19 illustrates vacuum packaging receptacle 830 in accordance with yet another embodiment of the present invention. The vacuum packaging receptacle 830 includes a patterned film sheet 800, a second film sheet 832, and three sealed edges 834. The patterned film sheet 800 may have a zigzag or other type of pattern. The second film sheet 832 may be formed with or without patterns, either way the pattern of the film sheet 800 aids in evacuation by forming airchannels during vacuum evacuation.

In view of the foregoing, it will be appreciated by one skilled in the art that a pattern imprinting means can include the cooling roller with the inverse pattern, a cooling plank with an inverse pattern, an air-knife, an inverse-vacuum and the like.

An advantage of the present invention is that a multi-layer, patterned vacuum packaging film can be produced economically and yet still meet necessary demanding technical requirements. Additionally, the use of an air-knife, or conversely the inverse vacuum, enables custom patterns to be easily implemented as opposed to changing a roller embedded with an inverse pattern.

While this invention has been described in terms of certain preferred embodiments, it will be appreciated by those skilled in the art that certain modifications, permutations and equivalents thereof are within the inventive scope of the present invention. It is therefore intended that the following appended claims include all such modifications, permutations and equivalents as fall within the true spirit and scope of the present invention.

What is claimed is:

1. A method for manufacturing a multi-layer film for use in vacuum packaging applications, said method comprising the steps of:
   heat-extruding a first material onto a spinning cooling roll;
   heat-extruding a second material onto said spinning cooling roll such that said first and second extruded materials bond in intimate and comprehensive contact forming first and second layers of said multi-layer film during a cooling of said first and second extruded materials; and
   said cooling roll simultaneously applying a pattern to and cooling said first and second layers, said pattern forming channels suitable for evacuation of gas from a vacuum packaging bag made of said multi-layer film.

2. A method for manufacturing a multi-layer film as recited in claim 1, wherein said first material is a heat-sealable resin.

3. A method for manufacturing a multi-layer film as tecited in claim 2, wherein said second material is a gas impermeable material.

4. A method for manufacturing a multi-layer film as recited in claim 3, further including an act of heat-extruding a first bonding material in between said first and second material, said first bonding material forming a first bonding layer between said first and second layers.

5. A method for manufacturing a multi-layer film as recited in claim 4, further comprising the act of heat-extruding a second bonding material and a structural material to form a second bonding layer and a structural layer, said second bonding layer bonding said structural layer to said second layer, said structural layer intended to provide additional strength to said multi-layer film.

6. A method for manufacturing a multi-layer film as recited in claim 5, wherein said act of applying a pattern operates to apply said pattern to all five layers of said multi-layer film.

7. A method for manufacturing a multi-layer film as recited in claim 1, wherein the act of applying a pattern to said first and second layers is accomplished by providing said pattern on the circumferential surface of said cooling roll.

8. A method for inanufactuzing a multi-layer film as recited in claim 7, further including the act of positioning a laminating roll to apply pressure to the extruded materials in order to apply said pattern formed on the circumferential surface of said cooling roll onto said multi-layer film.

9. A method for manufacturing a multi-layer film as recited in claim 8 further including the act of controlling a temperature of said cooling roll in order to properly effectuate cooling and fonnation of said first and second layers.

10. A method for manufacturing a multi-layer film as recited in claim 1, wherein said pattern is a zigzag pattern.

11. A method for manufacturing a multi-layer film as recited in claim 1, wherein said channels formed by said pattern have a varying width thereby retarding fluid flow therethrough.

12. The method as recited in claim 7 wherein said cooling roller contains an inverse-pattern that imparts a pattern onto said vacuum packaging film.

13. A method for manufacturing a multi-layer film for use in vacuum packaging applications, said method comprising the steps of:
   heat-extruding a first material onto a patterned cooling plank;
   heat-extruding a second material onto said patterned cooling plank such that said first and second extruded materials bond in intimate and comprehensive contact forming first and second layers of said multi-layer film during a cooling of said first and second extruded materials;
   said cooling plank simultaneously applying a pattern to and cooling said first and second layers, said pattern forming channels suitable for evacuation of gas from a vacuum packaging bag made of said multi-layer film; and
   directing said patterned multi-layer film over said a cooling roll.

14. A method for manufacturing a multi-layer film as recited in claim 13, further including the act of controlling a temperature of said cooling plank to properly effectuate cooling and fonnation of said first and second layers.

15. The method as recited in claim 13 wherein said cooling plank contains an inverse-pattern that imparts a pattern onto said vacuum packaging film.

16. A method for manufacturing a vacuum packaging bag, said method comprising:
   a) forming a first patterned film sheet including:
      i) heat-extruding a first material onto a spinning cooling roll;
      ii) heat-extruding a second material onto said spinning cooling roll such that said first and second materials bond in intimate and comprehensive contact forming first and second layers of said first patterned film sheet during a cooling of said first and second extruded materials; and
      iii) said coaling roll simultaneously applying a pattern to and cooling said first and second layers, said pattern forming channels suitable for evacuation of gas from said vacuum packaging bag made in part of said first and second patterned film sheet;

b) bonding a second film sheet onto said first film sheet via sealing opposing sides to form a pouch with two open ends;

c) sizing said pouch to a desired size; and d) bonding a one of said open ends to form a vacuum packaging bag.

17. A method of manufacturing a vacuum packaging bag as recited in claim 16, wherein said pattern is a zigzag pattern.

18. A method of manufacturing a vacuum packaging bag as recited in claim 16, wherein smd second film sheet is patterned.

19. A method of manufacturing a vacuum packaging bag as recited in claim 16, wherein bonding said second film sheet onto said first film sheet includes applying heat along said opposing sides.

20. A method of manufacturing a vacuum packaging bag as recited in claim 16, wherein bonding said second film sheet onto said first film sheet includes applying pressure along said opposing sides.

21. A method for manufacturing a roll of vacuum packaging bag material, said material comprising:

a) forming a first patterned film sheet including:

i) heat-extruding a first material onto a spinning cooling roll;

ii) heat-extruding a second material onto said spinning cooling roll such that said first and second materials bond in intimate and comprehensive contact forming first and second layers of said first patterned film during a cooling of said first and second extruded materials; and iii) said cooling roll simultaneously applying a pattern to and cooling said first and second layers, said pattern operable to form channels suitable for evacuation of gas from said vacuum packaging bag made of said first and a second patterned film sheet;

b) bonding said second film sheet onto said first film sheet via sealing opposing sides to form a pouch with two open ends; and c) forming said pouch into said roll of vacuum packaging material.

22. A method for manufacturing a roll as recited in claim 21, wherein said pattern is a zigzag pattern.

23. A method for making vacuum packaging film comprising:

heat-extruding a first material in the vicinity of an air-knife;

heat-extruding a second material such that said first and second extruded materials bond in intimate and comprehensive contact forming first and second layers of said multi-layer film during a cooling of said first and second extruded materials in the vicinity of said air-knife; and applying a pattern to said first and second layers while simultaneously cooling said first and second extruded materials, said pattern operable to form channels suitable for evacuation of gas from a vacuum packaging bag made of said multi-layer film.

24. A method as recited in claim 23 wherein said air-knife in an inverse-vacuum.

25. A method as recited in claim 23 wherein said air-knife imparts said pattern onto said vacuum packaging film.

26. A method recited as in claim 24 wherein said air-knife imparts said pattern onto said vacuum packaging film.

* * * * *